US008468379B2

(12) United States Patent
Trantham

(10) Patent No.: US 8,468,379 B2
(45) Date of Patent: Jun. 18, 2013

(54) SYSTEMS, METHODS AND DEVICES FOR CONTROL AND GENERATION OF PROGRAMMING VOLTAGES FOR SOLID-STATE DATA MEMORY DEVICES

(75) Inventor: Jon David Trantham, Chanhassen, MN (US)

(73) Assignee: Seagate Technology LLC, Cupertino, CA (US)

( * ) Notice: Subject to any disclaimer, the term of this patent is extended or adjusted under 35 U.S.C. 154(b) by 991 days.

(21) Appl. No.: 12/492,951

(22) Filed: Jun. 26, 2009

(65) Prior Publication Data

US 2010/0332859 A1    Dec. 30, 2010

(51) Int. Cl.
*G06F 1/30*          (2006.01)
*G06F 1/26*          (2006.01)
*G06F 13/00*       (2006.01)

(52) U.S. Cl.
USPC ........................ 713/340; 713/300; 711/100

(58) Field of Classification Search
USPC ................... 713/300–340; 711/100, 102–106
See application file for complete search history.

(56) References Cited

U.S. PATENT DOCUMENTS

| | | | |
|---|---|---|---|
| 4,510,400 A | 4/1985 | Kiteley | |
| 5,367,489 A | 11/1994 | Park et al. | |
| 5,459,850 A | 10/1995 | Clay et al. | |
| 5,483,486 A | 1/1996 | Javanifard et al. | |
| 5,497,119 A | 3/1996 | Tedrow et al. | |
| 5,537,360 A | 7/1996 | Jones et al. | |
| 5,546,042 A | 8/1996 | Tedrow et al. | |
| 5,567,993 A | 10/1996 | Jones et al. | |
| 5,592,420 A | 1/1997 | Cernea et al. | |
| 5,914,542 A | 6/1999 | Weimer et al. | |
| 5,959,926 A | 9/1999 | Jones et al. | |
| 6,091,617 A | 7/2000 | Moran | |
| 6,404,647 B1 | 6/2002 | Minne' | |
| 6,567,261 B2 | 5/2003 | Kanouda et al. | |
| 6,700,352 B1 | 3/2004 | Elliott et al. | |
| 6,788,027 B2 | 9/2004 | Malik | |
| 6,838,923 B2 | 1/2005 | Pearson | |
| 6,862,651 B2 * | 3/2005 | Beckert et al. | 711/103 |
| 6,957,355 B2 * | 10/2005 | Acton et al. | 713/340 |
| 6,981,161 B2 | 12/2005 | Koo | |
| 7,019,583 B2 | 3/2006 | Del Signore, II et al. | |
| 7,173,821 B2 | 2/2007 | Coglitore | |
| 7,177,222 B2 | 2/2007 | Spengler | |
| 7,233,890 B2 | 6/2007 | Shapiro et al. | |
| 7,268,998 B2 | 9/2007 | Ewing et al. | |
| 7,269,755 B2 | 9/2007 | Moshayedi et al. | |
| 7,305,572 B1 | 12/2007 | Burroughs et al. | |
| 7,310,707 B2 | 12/2007 | Olds et al. | |
| 7,318,121 B2 | 1/2008 | Gaertner et al. | |

(Continued)

OTHER PUBLICATIONS

N. Li, J. Zhang, and Y. Zhong, "A Novel Charging Control Scheme for Super Capacitor Energy Storage in Photovoltaic Generation System," DRPT2008 Apr. 6-9, 2008 Nanjing China.

(Continued)

*Primary Examiner* — Tim T Vo
*Assistant Examiner* — Trisha Vu
(74) *Attorney, Agent, or Firm* — Crawford Maunu PLLC

(57) ABSTRACT

In one embodiment, a solid-state drive contains a plurality of data memory devices requiring elevated voltages for erasure and programming operations. A common voltage regulator, external to the data memory devices, provides the elevated voltage, thereby reducing the overall power consumption of the data storage device.

19 Claims, 4 Drawing Sheets

U.S. PATENT DOCUMENTS

| | | | |
|---|---|---|---|
| 7,321,521 | B2 | 1/2008 | Spengler |
| 7,334,144 | B1 | 2/2008 | Schlumberger |
| 7,404,073 | B2 | 7/2008 | Felts |
| 7,404,131 | B2 | 7/2008 | McCarthy et al. |
| 7,414,335 | B2 | 8/2008 | Hussein et al. |
| 7,484,109 | B2 * | 1/2009 | Feldman et al. ............. 713/300 |
| 7,487,391 | B2 | 2/2009 | Pecone et al. |
| 7,802,121 | B1 * | 9/2010 | Zansky et al. ................ 713/340 |
| 2006/0080515 | A1 | 4/2006 | Spiers et al. |
| 2006/0136765 | A1 * | 6/2006 | Poisner et al. ............... 713/323 |
| 2006/0212644 | A1 * | 9/2006 | Acton et al. ................. 711/103 |
| 2007/0223870 | A1 | 9/2007 | Farling et al. |
| 2008/0007219 | A1 | 1/2008 | Williams |
| 2008/0189484 | A1 * | 8/2008 | Iida et al. .................... 711/114 |
| 2008/0232144 | A1 | 9/2008 | Klein |
| 2009/0006877 | A1 | 1/2009 | Lubbers et al. |
| 2010/0167557 | A1 * | 7/2010 | Hoang ........................... 439/62 |
| 2010/0205470 | A1 * | 8/2010 | Moshayedi et al. .......... 713/340 |

OTHER PUBLICATIONS

ECNmag.com, "1.2A, 1.6MHz Synchronous Boost Regulator from Linear Technology," Top News, Jan. 8, 2009.

Intel® Mainstream SATA Solid State Drives, "Intel® X25-M and X18-M Mainstream SATA Solid-State Drives".

"Get the Lowdown on Ultracapacitors," Penton Media, Inc., Nov. 15, 2007.

STMicroelectronics, "Regulating Pulse Width Modulators, SG3524," Jul. 2000.

Linear Technology, "1.2A Synchronous Step-up DC/DC Converter with Input Current Limit, LTC3125," 2008 .

* cited by examiner

SYSTEMS, METHODS AND DEVICES FOR CONTROL AND GENERATION OF PROGRAMMING VOLTAGES FOR SOLID-STATE DATA MEMORY DEVICES

FIELD OF THE INVENTION

Aspects of the present invention relate to the generation and control of data memory device voltages in solid-state data storage devices that can be particularly useful for applications in which power consumption performance, and/or device cost are important issues.

BACKGROUND

Computer systems generally have several levels of memory; each level of memory can provide differing levels of speed, memory capacity, physical size, cost, power requirements, voltage levels and/or volatility. These aspects are often at odds with each other. For example, increases in speed often lead to corresponding increases in power requirements. For this reason, many systems use a variety of different memories within the same system. From the perspective of a computer program these memories are often hidden in the sense that common data is temporarily cached in smaller and faster memory circuits. This common data is mapped to larger and slower memory circuits, which are accessed when the faster memory does not contain the desired data. The common data, if changed in the cached memory, can eventually be written to the larger and slower memory circuits. This allows for the slower memory's access time to be avoided or hidden, so long as the faster memory contains the appropriately mapped data.

Computer systems generally contain some type of mass-storage nonvolatile memory that is able to retain stored data when the computer system is powered down. This type of memory is referred to as nonvolatile memory because it is able to maintain data integrity when the computer system is not powered. Nonvolatile memory, however, may be slower by orders of magnitude relative to various volatile memories. Yet, nonvolatile memory can also be less expensive (per unit of memory capacity) and/or less power-hungry. A common type of nonvolatile data-storage device is a hard disc drive (HDD) that uses a rotating magnetic media for data storage. HDDs are used for home-computers, servers, workstations, consumer-electronics and various other devices. Under normal operation, a computer system transfers data, requiring nonvolatile/temporary retention, from temporary memory to a HDD before the computer system is powered down. This allows for the system's data to be retained after the power is removed from the computer system. When the computer system is subsequently powered up, this data can be accessed and used by the computer system.

HDDs with rotating magnetic media have been in use for many years and have undergone various improvements including efficiency, reliability and data storage capacity. Various applications, however, are beginning to use other types of mass data storage devices with more frequency. Solid State Drives (SSDs), using electronic nonvolatile memory, such as flash, are one such type of device, and are attractive for many applications. Speed, cost and power requirements factor into the selection of data storage devices such as SSDs or HDDs.

As mentioned, SSDs use electronic nonvolatile memory for storage. In many electronic nonvolatile memories, such as flash, erasing, programming, or reading data can require different, usually higher, voltages than what is supplied to the memory device via its core and/or input-output (I/O) voltage supply connections. On early-generation flash components this was accomplished by one or more additional voltage rails, for instance by a voltage rail commonly known as Vpp. With the incorporation of internal voltage boosters, such as switched-capacitor charge pumps, the Vpp voltage rail has been eliminated on newer data memory designs to the point where now virtually all modern data memory components generate these higher voltages internally. This typically simplified the system design by reducing the number of required externally-applied voltages.

Unfortunately, the internal voltage generation circuitry within these data memory devices may be inefficient, especially when compared to external voltage booster circuitry. Internal boost regulators are generally limited to what can be readily fabricated on a silicon die. Additionally, the voltage-generation circuitry within these data memories require die space and may increase the device's cost. This additional per-device cost can be especially costly when many data memories are used within a data storage device. Moreover, the voltages generated internally may not be optimal for storage performance. For instance, the charge-pump circuit may be limited in its output voltage, and this limitation may require longer erase or programming times.

SUMMARY

The present invention is directed to data storage systems utilizing solid-state data memories for non-volatile data storage. Particularly where the memories internally require different voltages for programming, and/or erasing, and/or reading data than what is used for either their interface and/or their core logic. System for reducing power consumption and costs of said storage systems are described. These and other aspects of the present invention are exemplified in a number of illustrated implementations and applications, some of which are shown in the figures and characterized in the claims section that follows.

Consistent with one embodiment of the present invention, a solid-state data storage device is implemented that stores and retrieves data under the control of a memory control circuit. A primary solid-state memory circuit maintains data integrity in the absence of primary operating power. The primary solid-state memory circuit includes a plurality of data memory devices that require elevated voltage levels to erase, program, and read data. The data storage device contains a shared voltage rail that delivers voltage to each data memory device of the plurality of memory devices. A primary power supply input to the data storage device provides primary power at a primary voltage level that is lower than the programming level. A regulated boost circuit in the data storage device receives the primary voltage power from the system in which it is installed and generates a boosted voltage level from the primary voltage power. The boosted voltage level is higher than the primary voltage level. This boosted voltage is shared amongst the plurality of data memory devices and is used to program, erase, and read data within the devices.

Consistent with another embodiment of the present invention, a nonvolatile memory chip is implemented with electrical interface connections for communication of data into and out of the device. Electrical power connections receive externally supplied electrical power, the electrical power connections including a read-voltage input and a programming-voltage input. Memory storage cells store data using a voltage level higher than a voltage level of the read-voltage input. Detection circuitry monitors externally-supplied voltage on the programming-voltage input. One or more charge pumps generate elevated voltage levels from the externally supplied electrical power in response to the monitoring of externally-applied voltage.

The above summary is not intended to describe each illustrated embodiment or every implementation of the present invention. The figures and detailed description that follow, including that described in the appended claims, more particularly exemplify these embodiments.

BRIEF DESCRIPTION OF THE DRAWINGS

The invention may be more completely understood in consideration of the detailed description of various embodiments of the invention that follows in connection with the accompanying drawings as follows.

Figure 1A:
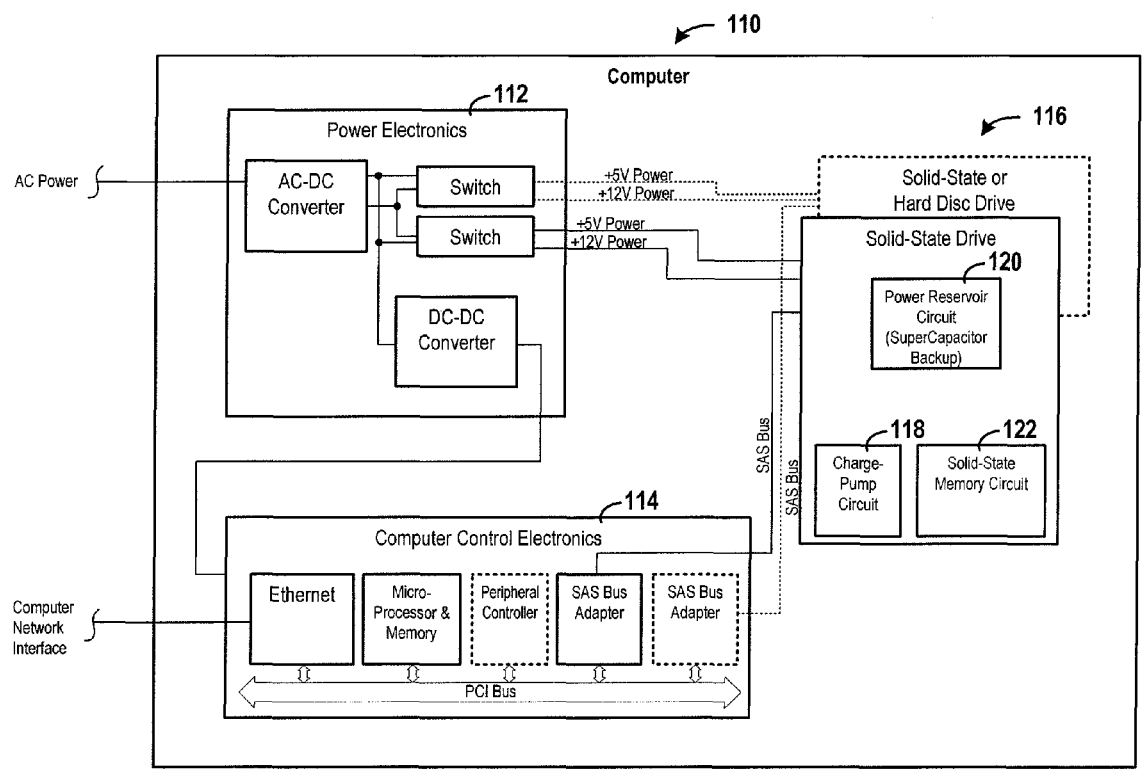
FIG. 1A shows a computer system configured for operating a solid-state memory device having an external boost regulator circuit, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present invention are believed to be useful for the generation and the controlling programming voltages for nonvolatile solid state data memory devices. Examples of nonvolatile solid-state data memory devices include, but are not limited to, NAND flash, NOR flash, phase-change memory, magnetic RAM (MRAM), race-track memory, resistive RAM, and spin-torque RAM. A particular application of the present invention relates to solid state data storage devices, such as solid-state drives (SSDs) that provide nonvolatile memory storage functions in the form of a mass storage device. While the present invention is not necessarily limited to such applications, various aspects of the invention may be appreciated through a discussion of various examples using this context.

Standard hard drive specifications may not provide for voltages sufficiently high to perform erase, write (program), or read functions within solid-state memory devices. Thus, conventional solid-state memory chips use integrated boost regulators, such as switched-capacitor charge pumps to increase externally provided voltages to sufficiently high levels for write functions to be performed. These pumps help alleviate the need for an externally supplied voltage for storage operations. Each memory chip contains a separate charge pump thereby allowing for operations to be performed using standard low voltage supplies as an input to the chips. For example, 5V, 3.3V, 2.5V, and 1.8V are popular supply voltages for NAND flash chips, but the Fowler-Nordheim tunnel injection process used within NAND chips typically requires a much higher electric field voltage, for example 20V.

The solid-state memory devices of embodiments of the present invention include a backup-power circuit for storing sensitive data in the event of a power loss. For instance, data cached in a volatile memory is written to the nonvolatile solid-state memory in the event of a power loss. It has been realized that an important aspect of solid-state drives is the power requirements during such backup-capabilities. The solid-state memory device is therefore designed with sufficient energy storage capacity to maintain operating power to the memories and associated control circuits for a time period sufficient to store pertinent data. A particular aspect of this embodiment recognizes that the backup procedure is heavily dependent upon writes to the non-volatile solid-state memory. Thus, the power requirements of the solid-state memory chips during write operations can be of particular import.

According to a specific embodiment of the present invention, a mass-storage device is implemented with a plurality of solid-state memory chips. The mass-storage device includes one or more global-boost-regulator circuits for boosting the voltage of a primary power source. The boosted voltage is supplied to each of the plurality of solid-state data memory chips. In this manner the individual voltage boosters are not required on each solid-state memory chip. The global-boost-regulator circuit can be specifically designed for high efficiency. For instance, the conventional boost regulators, such as switched-capacitor charge pumps provided within each solid-state memory chip are subject to significant inefficiencies due in part to the difficulties associated with implementing the boosters on the same integrated circuit die as the solid-state memory. Accordingly, the addition of a global-boost-regulator circuit is particularly useful for mass-storage devices that can be efficient and economical.

Consistent with another embodiment of the present invention, the global-boost-regulator circuit provides a voltage that is significantly higher than the voltage required by the solid-state data memory chips. The solid-state data memory chips include a voltage regulator circuit for stepping down this voltage to a desired level. Rather surprisingly, this series of step up and step down voltage changes can still provide efficiency gains over the conventional on-chip charge-pump circuits. Voltage step-down regulator circuits have more easily and efficiently implemented on the same die as the solid-state memory circuits. Thus, the efficiency loss due to the voltage step-down can be more than offset by the increased efficiency in the global-boost-regulator circuit. Moreover, the overhead in excess voltage from the global-boost-regulator circuit allows for increased flexibility in the type of solid-state memory circuits used. Additionally, the voltages generated internally via the prior-art may not be optimal for storage performance. For instance, the charge-pump circuit may be limited in its output voltage, and this limitation may require longer erase or programming times. Using an external regulator allows for flexibility in the selection of voltage and thereby can increase storage performance.

According to one embodiment of the present invention, the plurality of solid-state memory circuits can include multiple types of solid-state memory circuits which each have different voltage level requirements for storage operations. The global-boost-regulator circuit provides a voltage that is at or above the different voltage level requirements and each solid-state memory circuit regulates this provided voltage to a respective voltage level. Accordingly, the mass-storage device is particularly useful for allowing the free use of different types of solid-state memory circuits by a manufacturer.

For instance, the manufacture is free to mix and match different solid-state memory circuits independent of their write voltage requirements, while also having improved efficiency over on-chip voltage boosters.

According to another embodiment of the present invention, a mass-storage device is implemented for use with modular solid-state memory circuits. These modular solid-state memory circuits can be swapped out with new memory circuits as desired. This can be useful at the manufacturing level as well as for allowing for customers to purchase memory upgrades or replacements for an existing device, thereby alleviating the need to replace the entire drive including, for example, the structural support, the memory controller logic and the backup power circuit.

Consistent with another embodiment of the present invention, the global-boost-regulator circuit is responsive to a voltage control signal. The voltage control signal determines the voltage level provided to the solid-state memory circuits for write operations. Logic circuitry detects the type of solid-state memory circuits and generates the appropriate voltage control signal. The global-boost-regulator circuit sets the voltage level accordingly. Thus, a step down regulator need not be provided for each solid-state memory circuit because the global-boost-regulator circuit can be configured for different voltages. In this manner, the solid-state memory circuits with different voltage requirements can be accommodated using the same global-boost-regulator circuit.

Turning now to the figures, FIG. 1A shows a computer system configured for operating a solid-state memory device having an external boost regulator circuit, according to an example embodiment of the present invention. The computer system includes a computer 110 that includes one or more solid-state drives 116. Solid state drives 116 have the capability of providing backup power, using energy reservoir circuit 120, in response to a system power interruption. Computer control electronics 114 control the flow of data between the processing elements of the computer, memory storage elements (e.g., solid-state/hard drives 116) and various computer interfaces (e.g., network interfaces or display devices). The computer 110 includes power electronics 112 that receive power from an external source, which can include, as examples, alternating current (AC) sources or batteries. The power electronics 112 generate one or more direct current (DC) voltages (e.g., 5 V or 12 V) and provide the generated DC voltages to the necessary computer components, including solid-state drive 116.

Solid-state drive 116 includes a power reservoir circuit 120 for providing operating power for the solid-state drive in the event of a power loss. In a specific implementation, the device includes a power reservoir circuit 120 that includes one or more energy storage devices, such as supercapacitors, for storing backup energy used during a power-loss event. Solid-state drive 116 also includes a boost-regulator circuit 118 for boosting the DC voltages supplied by the power electronics 112. The boosted DC voltage is then provided to the solid-state memory chips of the solid state drive, which use the boosted voltage for write/read/programming accesses as-needed thereto.

In one embodiment of the present invention, the boosted DC voltage is provided to each of the solid-state memory chips using a shared power resource. The shared power resource allows the boosted voltage to be used by more than one memory chip.

In one embodiment of the present invention, the solid-state drive 116 is implemented within a traditional hard drive form factor. The electrical interface between the drive 116 and the computer is shown as a SAS (serially-attached SCSI) interface, but is not limited to any specific hard drive specification or interface.

According to an alternative embodiment of the present invention, the solid-state drive 116 is implemented according to a non-traditional form factor. In particular, solid-state drives do not contain mechanical disks and motors associated with traditional magnetic disk drives. This allows for more freedom in the design and placement of the various circuits, such as the memory controller circuit, the non-volatile memory circuit, the energy reservoir circuit (if used) and the energy-storage devices, such as supercapacitor(s). In a specific implementation, the power reservoir circuit 120 (and possibly the boost regulator 118) can be placed on a different circuit board. This can be useful for allowing shared use of the circuits between multiple solid-state devices.

Figure 1B:
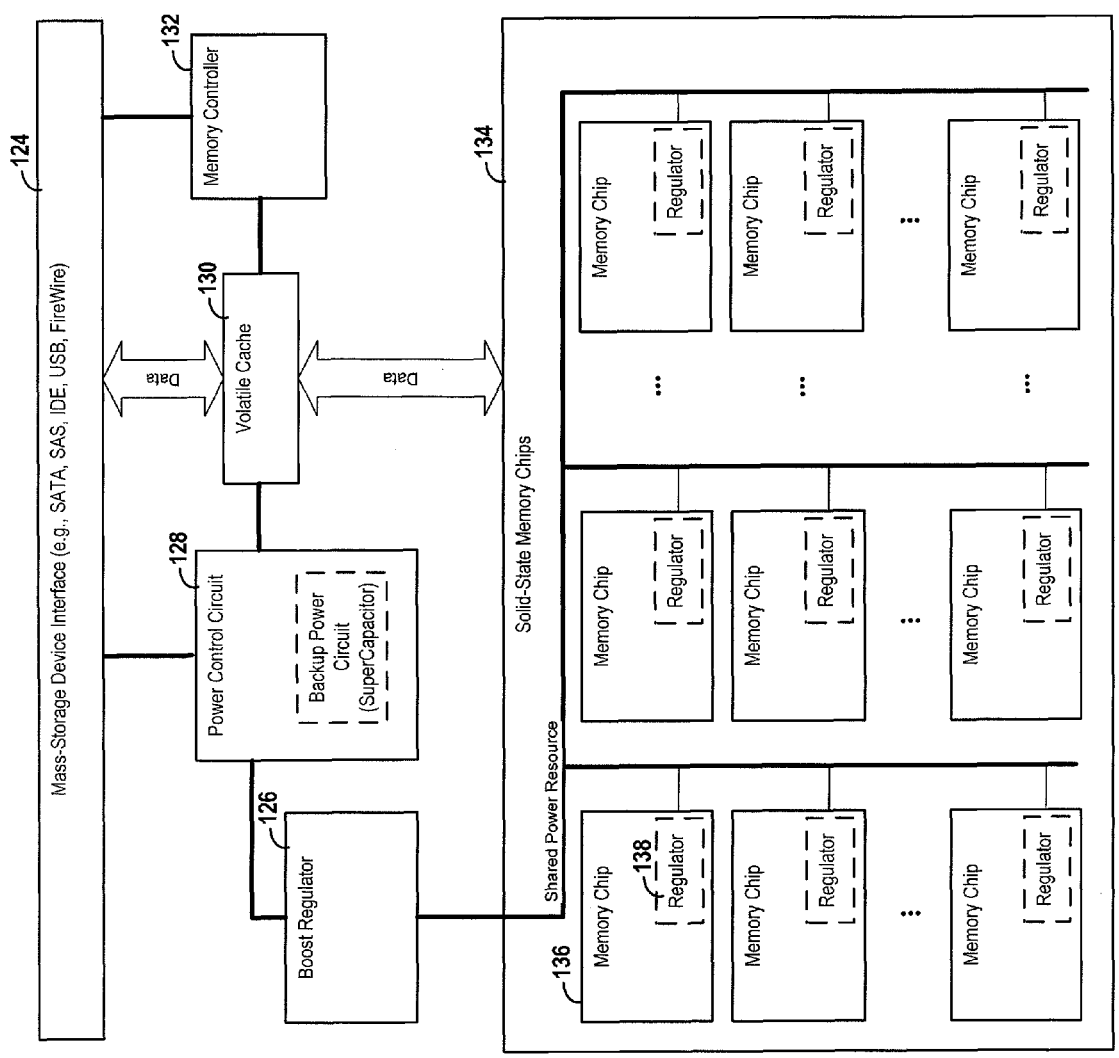
FIG. 1B shows a solid-state memory device having an external boost regulator circuit, according to an example embodiment of the present invention.

FIG. 1B shows a solid-state memory device having an external boost regulator circuit, according to an example embodiment of the present invention. A device interface 124 provides power, data and control signals to the solid-state memory device. During normal operation, data is transferred between the array of solid-state memory chips 134 and the device interface 124 under the control of memory controller 132. Volatile cache memory 130 provides temporary caching of this data and can help hide delays and latency associated with the solid-state memory chips 134. Power control circuit 128 provides power to the volatile cache, the solid-state memory chips and the memory controller. In the event of a power loss, a backup power circuit provides stored power (e.g., capacitive energy stored on a supercapacitor) until the data from the volatile cache 130 can be stored in the solid-state memory chips 134.

The individual memory chips 136 require a different voltage level than what is supplied for the core and/or I/O rails to perform storage operations. For example, higher voltages to perform write, read and erase operations. Clearly in some embodiments, the memory chips may only require different voltage levels for a subset of these operations, for example only for writing/programming. In some embodiments, the memory devices may not require erase operations, for example in phase-change memory. In a particular instance, the memory chips require higher write-voltage levels which are determined by the voltage necessary to store data by biasing the floating gate of a flash cell. Thus, the voltage should be sufficient to change the floating gate charge (i.e., using a tunneling effect). Boost regulator 126 receives voltage from the power control circuit 128 and boosts the voltage to a higher level. The boosted voltage is then provided to each of the memory chips 136 using a shared power resource. The shared power resource can be implemented as a power bus having individual connection wires for each chip.

In a particular implementation, the boosted power is specifically set to be directly useable by the memory chips 136 during a write operation. In such an implementation, the memory chips 136 need not have internal voltage regulation. In another implementation, the memory chips 136 include such an internal voltage regulation. This can be due to the boosted voltage being slightly higher or lower than necessary. In such an instance, the internal voltage regulation can reduce or increase the supplied voltage at each chip as necessary. The voltage regulation could also be used to further condition the voltage by filtering or otherwise improving the voltage characteristics. This can be particularly useful for filtering electrical interference seen on the shared resource, which can be caused by internally or externally generated electromagnetic interference.

According to certain embodiments, the memory devices can each include detection circuitry to assess the externally provided voltage level. The internal voltage regulators of the memory devices can be enabled or disabled in response to the adequacy of the externally provided voltage from the boost regulator 126.

In another embodiment of the present invention, the boost circuit/regulator 126 can include multiple regulator outputs. Each regulator output can provide programming power to a subset of all the memory chips 136 using respective shared power resources. This could be particularly useful for allowing sub-loading of components of the regulator circuit during manufacturing. For instance, the same circuit board design could be used for different memory options in which some of the memory chip slots are not populated for one of the options. Partitioning the boost regulator/circuit 126 into multiple, relatively independent portions and respective outputs, can thereby allow for partial populating of components in the boost regulator/circuit 126 as determined by the memory population options.

Figure 2:
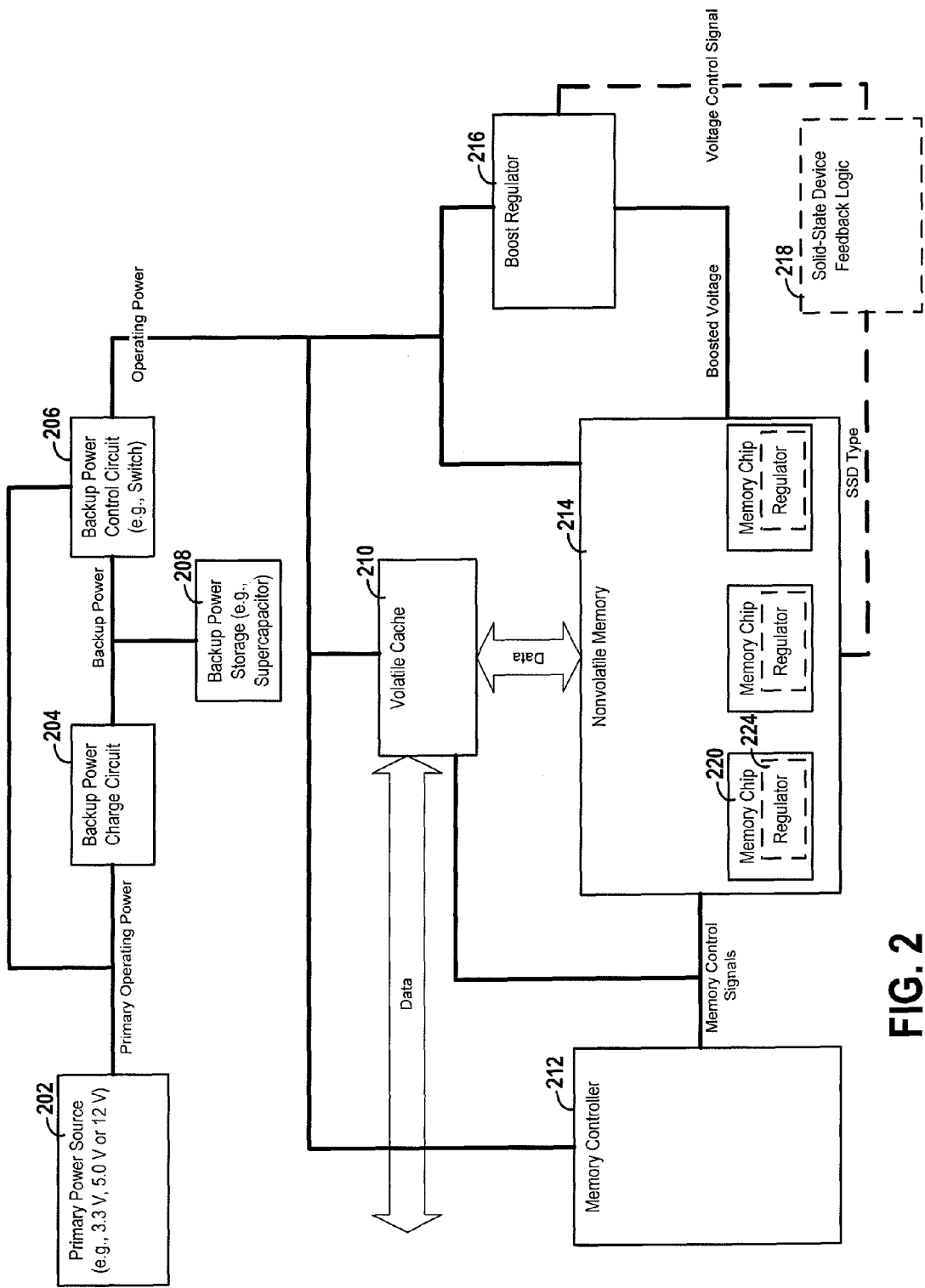
FIG. 2 shows a block diagram for a solid-state memory circuit that shares a boost regulator circuit between multiple solid-state memory chips, according to an example embodiment of the present invention.

FIG. 2 shows a block diagram for a solid-state memory circuit that shares a boost regulator circuit between multiple solid-state memory chips, according to an example embodiment of the present invention. Primary power source 202 provides primary operating power to the memory device. A backup power charge circuit 204 controls storage of backup energy by backup power storage block 208. A backup power control circuit 206 controls when or if backup power is used, e.g., in the event of a power loss. Operating power from the backup power control circuit 206 is used to power volatile cache 210, memory controller 212 and nonvolatile memory 214. Boost regulator 216 also receives the operating power and generates a boosted voltage. This boosted voltage is provided to nonvolatile memory 214 and more specifically to memory chips 220. If necessary or desired, memory chips 220 can include a local voltage regulator circuit as discussed in more detail above.

According to one optional implementation, solid state device feedback logic 218 is provided. Data indicating the type of solid-state device is received or generated to determine the voltage requirements of the memory chips 220. Solid state device feedback logic 218 generates a corresponding voltage control signal from the determined voltage requirements. Boost regulator 216 responds to the voltage control signal by setting the level of the boosted voltage consistent with the voltage requirements of the memory chips 220. In this manner, the output of boost regulator 216 is variable as determined by the specific type of memory chips 220 used in the system.

Figure 3:
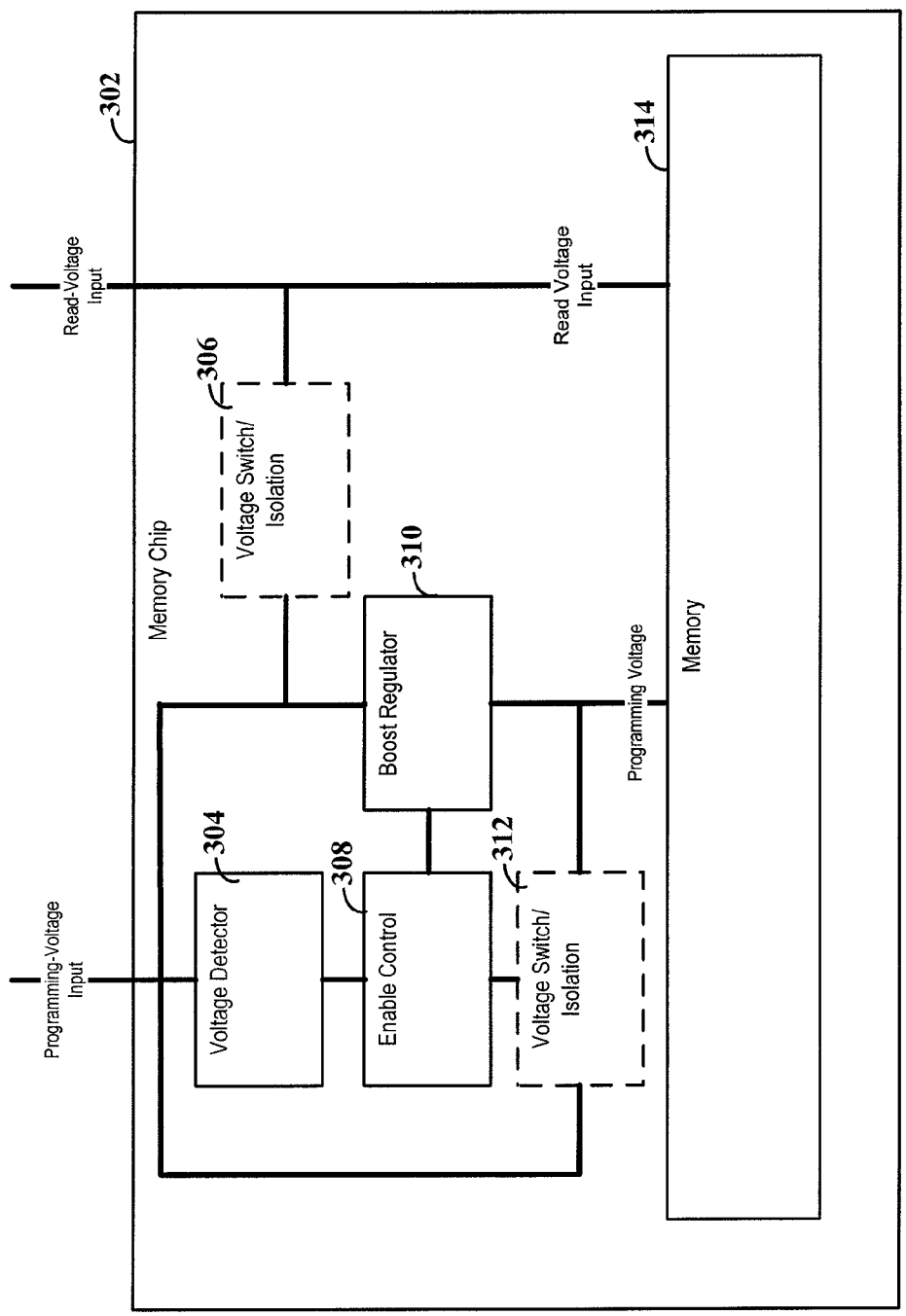
FIG. 3 shows a block diagram for a solid-state memory chip having a controllable boost regulator circuit, according to an example embodiment of the present invention.

According to a specific embodiment, boost regulator 216 is implemented as a DC-DC inductive switching boost regulator FIG. 3 shows a block diagram for a solid-state memory chip having a controllable boost-regulator circuit, according to an example embodiment of the present invention. FIG. 3 shows a memory chip 302 that is designed to function in different modes of operation that are dependent upon the voltage level detected on the programming-voltage input. The voltage levels seen on the programming-voltage input and the read-voltage input are dependent upon the externally-applied power provided by power sources of the system in which the memory chip resides. Detection and monitoring of the programming-voltage input is performed by voltage detection circuit 304. In response to this monitoring, enable control 308 controls the operation of voltage boost regulator 310. In a particular implementation, enable control circuit can enable the voltage boost regulator 310 when the programming input voltage level is below a voltage threshold. When enabled, boost regulator 310 generates a suitable programming-voltage level that is then provided to the memory 314. The voltage threshold can be determined as a function of the required programming voltage.

In one implementation, one or both of the voltage isolation/switches 306 and 312 can be implemented. When the programming-voltage input level is sufficient, the voltage boost regulator 310 can be disabled and the programming-voltage input level can be used without voltage regulation. Filtering of the voltage levels, however, can still be provided as desired. When the programming input level is insufficient, the chip enables the boost regulator 310, and the output of the boost regulator 310 is used for programming of the memory.

According to one embodiment, the read-voltage input can provide the electrical power to the boost regulator 310 when the programming input level is completely absent or otherwise inadequate. Isolation/switch 312 can route the read-voltage input to the boost regulator 310. The boost regulator 310 then generates a programming voltage from the read-voltage input.

Variations on the power routing and boosting of the voltages are possible. For instance, the boost regulator 310 can include isolation and switching circuitry such that when disabled, the programming-voltage input is passed directly to the memory for programming functions. In another instance, boost regulator 310 or an additional regulator circuit (not shown) can regulate the programming-voltage input to a lower voltage level in response to the programming-voltage input being above a second voltage threshold.

As discussed herein embodiments of the present invention are directed toward providing alternative voltage levels to the memory chips. A particular embodiment, which can be implemented alone or in combination with various other aspects discussed herein, is directed towards a solid-state data storage device that stores and retrieves data in response to external control. The device includes electrical connections, sufficient to receive electrical power from the host system, a plurality of data memory devices with connections to a communication interface and for receipt of electrical power. The data memory devices require voltages different than their communication interface voltage level to store and/or retrieve data thereto. One or more voltage-regulator circuits are configured to receive the electrical power from a host system and to convert the voltage level from the host system to a different level and delivering the converted voltage level to said memory devices. The voltage-regulator circuit is used to provide the data memory devices with electrical voltage level(s) that are better suited for the storage and/or retrieval of data within said memory devices.

Aspects of the present invention are particularly suited for applications in which the solid-state memory is used to provide disc-drive functionality to a computer system. In this regard, a variety of disc-drive form factors, protocols and controllers can be used, including those that offer backward compatibility with traditional rotating media drives. Example communications standards include, but are not limited to, Serial Advanced Technology Attachment (SATA), Serial Attached SCSI (SAS), Advanced Technology Attachment (ATA), IEEE-1394, Fibre Channel Arbitrated Loop (FCAL), Universal Serial Bus (USB) or Small Computer System Interface (SCSI). Four example, non-limiting, form factors are 5.25 inch (half height): 5.75 in×1.63 in×8 in (146.1 mm×41.4 mm×203 mm), 3.5 inch (low height): 4 in×1 in×5.75 in (101.6 mm×25.4 mm×146 mm), 2.5 inch (small form factor): 0.59 in×2.8 in×3.9 in (15 mm×70 mm×100 mm) and 2.5 inch (low-profile small form factor): 0.28 in×2.8 in×3.9 in (7 mm×70 mm×100 mm).

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention, which is set forth in the following claims.

What is claimed is:

1. A solid-state data-storage device that stores data in response to data accesses under the control of a memory control circuit, the device comprising:
   a primary solid-state non-volatile memory circuit configured and arranged to maintain data integrity in the absence of primary operating power, the primary solid-state memory circuit including
      a plurality of non-volatile memory chips that require a programming-voltage level to write data thereto, and
      a shared power resource for delivering voltage to each chip of the plurality of memory chips;
   a primary power supply input providing primary power having a primary voltage level that is lower than the programming-voltage level;
   a voltage-boost circuit configured to
      receive the primary power and to generate a boost voltage level from the primary power, the boost voltage level being higher than the primary voltage level, and
      provide the boost voltage level to the shared power resource;
   a solid-state volatile memory circuit, under the control of the memory control circuit, susceptible to loss of data stored within in response to the voltage of the primary operating power dropping below a voltage threshold level; and
   a backup power-supplying circuit, including an energy-storage component, designed to hold sufficient energy to provide substantially all of the primary operating power to the memory circuits upon loss of externally-supplied power during a minimum time period sufficient to permit transfer of data from the volatile memory circuit to the solid-state non-volatile memory circuit in order to maintain the data integrity of the data storage device.

2. The device of claim 1, wherein the voltage-boost circuit includes a DC-DC inductive switching boost regulator.

3. The device of claim 1, wherein each chip of the plurality of memory chips includes a local voltage regulator for regulating the voltage delivered from the shared power resource.

4. The device of claim 1, further including a feedback circuit for generating a voltage control signal and wherein the voltage boost circuit is further configured to set the boost voltage level in response to the voltage control signal.

5. The device of claim 1, wherein the programming-voltage level is between about 13 Volts and 20 Volts.

6. The device of claim 1, wherein the plurality of memory chips includes at least two different memory chips each having a different programming-voltage level.

7. The device of claim 1, further including a module for containing the plurality of memory chips and facilitating replacement of the memory chips with another module containing other memory chips.

8. The device of claim 1, wherein the shared is a power bus electrically connected to each of the plurality of memory chips using individual connection wires.

9. A data storage device functioning as a disc drive, the emery device comprising:
   a disc-drive controller configured and arranged to interface with a computer system to provide mass storage;
   a primary non-volatile solid-state memory circuit under control of the disc-drive controller and configured and arranged to maintain data integrity in the absence of primary operating power, the primary solid-state memory circuit including
      a plurality of memory chips that require a programming-voltage level for programming data, and
      a shared power resource for delivering voltage to each chip of the plurality of memory chips;
   a primary power supply input receiving primary power from the computer system, the primary power having a primary voltage level different from the programming-voltage level;
   a voltage regulator circuit configured to
      receive the primary power and to generate a regulated voltage level from the primary power, the regulated voltage level being different from the primary voltage level, and
      provide the regulated voltage level to the shared power resource;
   a solid-state volatile memory circuit, under the control of a memory control circuit, susceptible to loss of data stored within in response to the voltage of the primary operating power dropping below a voltage threshold level; and
   a backup power-supplying circuit, including an energy-storage component, designed to hold sufficient energy to provide substantially all of the primary operating power to the memory circuits upon loss of externally-supplied power during a minimum time period sufficient to permit transfer of data from the volatile memory circuit to the solid-state non-volatile memory circuit in order to maintain the data integrity of the data storage device.

10. The device of claim 9, wherein memory chips require a higher voltage level than the primary voltage level and wherein the voltage regulator circuit includes a boost regulator.

11. The device of claim 9, wherein the disc-drive controller uses at least one of Serial Advanced Technology Attachment (SATA), Serial Attached SCSI (SAS), Advanced Technology Attachment (ATA), IEEE-1394, Fibre Channel Arbitrated Loop (FCAL), Universal Serial Bus (USB), and Small Computer System Interface (SCSI).

12. The device of claim 9, further including a feedback circuit for generating a voltage control signal and wherein the voltage regulator circuit is further configured to set the regulated voltage level in response to the voltage control signal.

13. The device of claim 9, wherein the programming-voltage level is between about 13 Volts and 20 Volts.

14. The device of claim 9, wherein each chip of the plurality of memory chips includes a local voltage regulator for regulating the voltage delivered from the shared power resource.

15. A non-volatile memory chip comprising:
   a non-volatile memory circuit for storing and providing data, the memory circuit requiring a read-voltage level to provide data and a programming-voltage level to programming data;
   electrical interface connections for communication of data from the memory circuit into and out of the chip;
   electrical power connections for reception of externally supplied electrical power, the electrical power connections including a read-voltage input and a programming-voltage input;

a plurality of memory storage cells configured to store data using a voltage level higher than a voltage level of the read-voltage input;

detection circuitry for monitoring externally-supplied voltage on the programming-voltage input;

one or more charge pumps for generating elevated voltage levels from the externally supplied electrical power in response to the monitoring of externally-applied voltage.

16. The chip of claim 15, wherein the detection circuitry detects a voltage level of the externally-applied voltages and the one or more charge pumps are enabled in response to the detected voltage level being lower than a programming voltage for the memory chip.

17. The chip of claim 15, further including isolation circuitry for providing the elevated voltage levels for programming of the memory in response to the externally-applied voltage being below a threshold voltage and for providing the programming-voltage input for programming of the memory in response to the externally-applied voltage being above the threshold voltage.

18. The chip of claim 15, further including routing circuitry for routing a read-voltage input to the one or more charge pumps in response to the programming-voltage input being below a voltage threshold.

19. The chip of claim 17, further including voltage regulating circuitry for providing reduced-voltage levels for programming of the memory in response to the externally-applied voltage being above another threshold voltage.

* * * * *

UNITED STATES PATENT AND TRADEMARK OFFICE
CERTIFICATE OF CORRECTION

| | |
|---|---|
| PATENT NO. | : 8,468,379 B2 |
| APPLICATION NO. | : 12/492951 |
| DATED | : June 18, 2013 |
| INVENTOR(S) | : Trantham |

It is certified that error appears in the above-identified patent and that said Letters Patent is hereby corrected as shown below:

In the Claims

Col. 9, line 67, Claim 9: "emery device" should read --device--

Signed and Sealed this
Twenty-fourth Day of March, 2015

Michelle K. Lee
*Director of the United States Patent and Trademark Office*